United States Patent
Weiss

(10) Patent No.: US 6,693,285 B1
(45) Date of Patent: Feb. 17, 2004

(54) FLUORESCENT FLUID INTERFACE POSITION SENSOR

(75) Inventor: Jonathan D. Weiss, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 64 days.

(21) Appl. No.: 10/102,172

(22) Filed: Mar. 20, 2002

(51) Int. Cl.⁷ .............................................. G01N 15/06
(52) U.S. Cl. ...................... 250/458.1; 250/577; 356/130
(58) Field of Search ........................... 250/458.1, 577, 250/227.21, 227.23, 231.1, 903; 356/130, 133, 136

(56) References Cited

U.S. PATENT DOCUMENTS

| | | | | |
|---|---|---|---|---|
| 4,745,293 A | * | 5/1988 | Christensen | ................ 250/577 |
| 4,870,292 A | | 9/1989 | Alpert et al. | ................ 250/577 |
| 4,942,306 A | | 7/1990 | Colbourne | ................ 250/577 |
| 4,994,682 A | * | 2/1991 | Woodside | ................ 250/577 |
| 5,004,913 A | * | 4/1991 | Kleinerman | ........... 250/227.21 |
| 5,422,495 A | * | 6/1995 | Cohn | .......................... 250/573 |
| 6,172,377 B1 | | 1/2001 | Weiss | ........................ 250/577 |

\* cited by examiner

*Primary Examiner*—Constantine Hannaher
*Assistant Examiner*—Otilia Gabor
(74) *Attorney, Agent, or Firm*—Robert D. Watson; Brian W. Dodson

(57) ABSTRACT

A new fluid interface position sensor has been developed, which is capable of optically determining the location of an interface between an upper fluid and a lower fluid, the upper fluid having a larger refractive index than a lower fluid. The sensor functions by measurement, of fluorescence excited by an optical pump beam which is confined within a fluorescent waveguide where that waveguide is in optical contact with the lower fluid, but escapes from the fluorescent waveguide where that waveguide is in optical contact with the upper fluid.

17 Claims, 4 Drawing Sheets

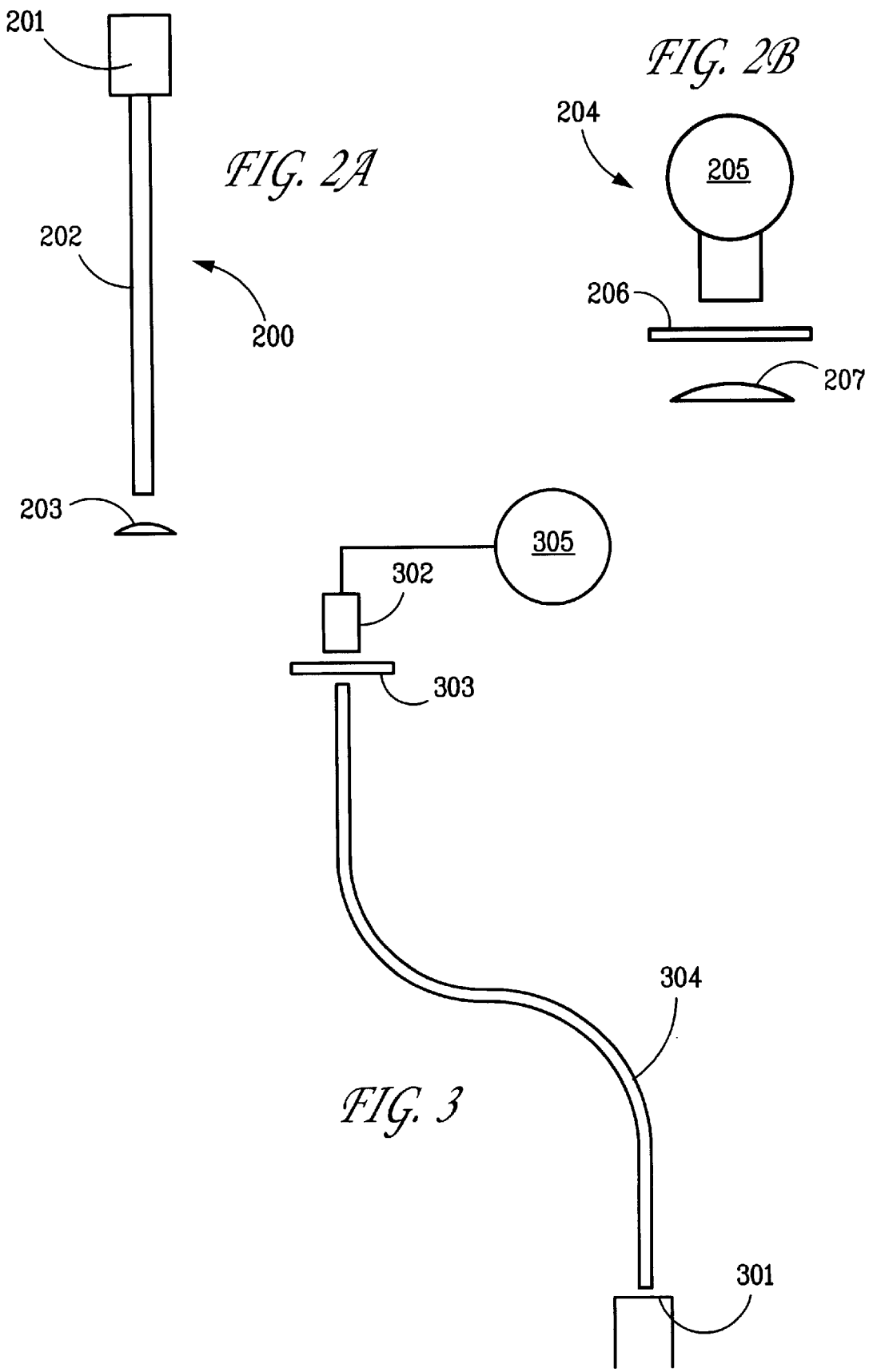

FLUORESCENT FLUID INTERFACE POSITION SENSOR

GOVERNMENT RIGHTS

This invention was made with Government support under Contract DE-AC04-94AL85000 awarded by the U.S. Department of Energy. The Government has certain rights in the invention.

FIELD OF THE INVENTION

The present invention relates generally to sensor devices, and more specifically to fluid interface position sensors which function via excitation and measurement of fluorescence.

BACKGROUND OF THE INVENTION

A common problem in oil storage technologies is contamination with water. When storage depots and fuel tanks are used, it is usually desirable that only oil or fuel should be pumped from the tank to use. Unfortunately, water is denser than oil, and hence lies at the bottom of such tanks or other storage vessels. As a result, unless the storage vessel is transparent, or has a sight gauge, it can be difficult to determine how much water is in the storage vessel. Knowledge of the oil-water interface level can serve to guide attempts to remove the water without contamination or waste, to insure that the water level is sufficiently low that the fuel can be safely pumped for use, or to dynamically adjust the pumping mechanism to avoid pumping water along with fuel.

Other combinations of immiscible fluids in storage present similar problems. For example, even the level of a fluid in a tank which is otherwise filled with air presents the problem of determining the position of an interface between two fluids in a blind vessel. Additionally, there are numerous situations in chemical engineering processes where knowledge and/or control of the position of a fluid interface is required.

Many prior art sensors address the problem of measuring the position of an upper surface of a fluid. Among these include the aforementioned sight gauge, float mechanisms, sensors to detect the change in thermal conductivity between the fluid and air, sensors to detect capacitance change resulting from the change in dielectric constant when the sensor is immersed in said fluid, ultrasonic or optical time of flight sensors to detect the distance to the upper surface of the fluid, and many others.

Some of the above upper fluid level sensors can be adapted to the problem of continuously sensing the position of a fluid interface within a storage tank. In particular, the sight gauge can typically be so used without modification, although the nature of the interface must be such that it is easily seen.

Float mechanisms must be designed so that the float has density intermediate to the two fluids forming the fluid interface. However, the driving force for such a float mechanism is typically greatly reduced from that of a float sensor for surface position, a factor which makes design and operation of such fluid interface position sensors less accurate and less reliable.

However, most of these approaches are inappropriate or inadequate for many applications. Requirement for direct visual monitoring, use of moving parts in the potentially harsh environment of a storage tank, poor resolution and/or accuracy, and use of electrical sensors in applications involving flammable liquids are among the factors which illustrate the need for improved fluid interface position sensors.

Application of optical sensors to the problem of fluid interface position measurement is attractive in that such optical sensors introduce no electrical energy into the storage tank, are insensitive to electromagnetic interference, have no moving parts, are suitable for remote monitoring of the interface position, and can provide a continuous measurement of the interface position.

A number of upper surface fluid level sensors based on fiber optics have been proposed. The background of such sensors is described in U.S. Pat. No. 6,172,377, by the present inventor. Said patent is hereby included in its entirety by reference. Such sensors are typically based on the detection of cladding loss which occurs when a properly designed optical fiber is immersed in a fluid.

Another approach in the art of upper surface fluid level sensors based on fiber optics appears in U.S. Pat. No. 4,870,292, to Alpert et al. This patent teaches a fluorescent doped detector fiber which collects light reflected from a source fiber in the presence of air. This light, however, is refracted away when a fluid of sufficiently high refractive index is present. Hence, the output signal from the fluorescent doped fiber is directly related to the fluid level.

U.S. Pat. No. 4,942,306, to Colbourne, builds upon the '292 patent above by embedding one end of the source optical fiber into a transparent substrate such that the injected light enters the substrate at such an angle that it will refract out of the substrate when the substrate is in the liquid, but will continue to be totally internally reflected when the substrate is in the air above the liquid. The detecting fiber is again a separate fluorescent doped fiber that is placed against the transparent substrate, said placement providing optical coupling between the detecting fiber and the transparent substrate.

U.S. Pat. No. 6,172,377, to Weiss, and included above by reference, describes the invention of a fluorescent optical sensor which is capable of detecting the position of a fluid interface, provided only that the upper fluid has smaller refractive index than does the lower fluid. Hence, the '377 sensor is suitable for detection of upper surface fluid levels, air having smaller refractive index than fluids.

The '377 sensor comprises a transparent waveguide containing fluorescent material. The fluorescent material is excited by light of a first wavelength, and responds by emission of light of a second and longer wavelength. The upper end of this waveguide is connected to a light source at the first wavelength through a beveled portion of the waveguide such that the input light is totally internally reflected within the waveguide above a fluid interface, but is transmitted into the bottom fluid below the fluid interface. (Again, within this invention this behavior requires that the upper fluid have smaller refractive index than does the lower fluid.) Hence, light is emitted from the fluorescent material only in those portions of the waveguide which are above the fluid interface. This emitted light is collected at the upper end of the waveguide by a detector sensitive only to the second wavelength. As the interface moves down in the tank, the signal strength from the detector will increase.

The '377 sensor provides a robust, sensitive, and accurate sensor of fluid interface level, with the primary limitation that the upper fluid must have smaller refractive index than the lower fluid. However, this limitation means that the '377 sensor cannot be applied to sensing the fluid interface level between, for example, fuel oil and water, where the upper fluid has larger refractive index than does the lower fluid.

Accordingly, there remains in the art need for a simple, low cost fluid interface position sensor based on fluorescent excitation, preferably realized as a single optical element immersed in the fluid.

SUMMARY OF THE INVENTION

A new fluid interface position sensor has been developed, which is capable of optically determining the location of an interface between an upper fluid and a lower fluid, where the upper fluid has larger refractive index than does the lower fluid. The sensor functions by measurement of fluorescence excited by an optical pump beam which is confined within a fluorescent waveguide where that waveguide is in optical contact with the lower fluid, but escapes from the fluorescent waveguide where that waveguide is in optical contact with the upper fluid.

BRIEF DESCRIPTION OF THE FIGURES

FIG. 1 shows schematic diagrams of various elements of the fluid interface position sensor of the present invention.

FIG. 2 shows schematic diagrams of two implementations of the collimated pump source. FIG. 2a shows a collimated pump source based on a semiconductor light source. FIG. 2b shows a collimated pump source based on a broadband light source.

FIG. 3 shows a schematic diagram of an implementation of the fluorescence collector for a fluid interface position sensor according to the present invention.

DETAILED DESCRIPTION

Figure 1A:
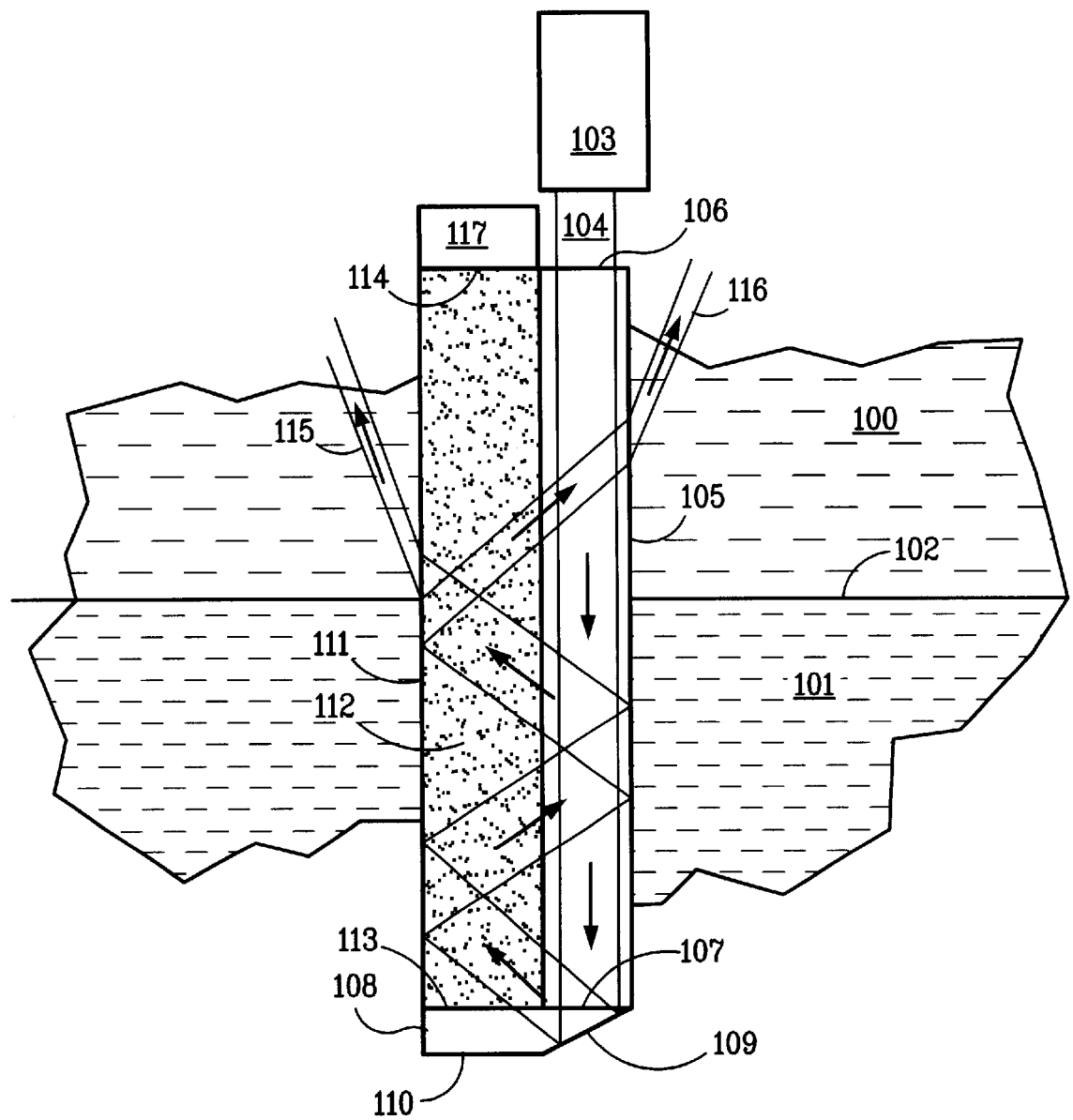
FIG. 1a shows the sensor in a side view, including optical paths therein.

One implementation of the fluid interface position sensor of the present invention is illustrated schematically in FIG. 1a. Here the sensor is immersed in a pair of immiscible fluids, upper fluid 100 and lower fluid 101, said fluids being separated by a fluid interface 102. The refractive index of upper fluid 100 is taken as greater than that of lower fluid 101, this being the situation in which the prior art optical fluid level sensor does not function.

The fluid interface position sensor comprises collimated pump source 103, optical conduit 105, redirection optics 108, continuous optical waveguide 111, and fluorescence collector 117.

Collimated pump source 103 generates a collimated pump beam 104 comprising light at a first wavelength. As shown in FIG. 2a, collimated pump source 200 can comprise a semiconductor light source 201 emitting the first wavelength, a fiber optic conduit 202, and collimation optics 203. When a fiber optic cable is used to bring the light from a source to the collimation optics, the collimated pump beam can be introduced to the sensor without requiring introduction of electrical power into the tank or vessel within which the fluid interface resides. This can be an important safety factor when one or both of the fluids or their vapors are flammable.

As shown in FIG. 2b, collimated pump source 204 can comprise a broadband light source 205, such as an incandescent or arc lamp, a filter 206 which passes a region of the optical spectrum comprising the first wavelength of light, and collimation optics 207. Other suitable designs for the collimated pump source will be clear to one skilled in the art.

As shown in FIG. 1a, optical conduit 105 comprises an optical medium characterized by a conduit refractive index, and has an upper end 106 through which collimated pump beam 104 can be introduced into optical conduit 105, and a lower end 107 through which collimated pump beam 104 can emerge from optical conduit 105.

In the implementation shown in FIG. 1a, collimated pump beam 104 passes down the central region of optical conduit 105, but this limitation is not a requirement of operation of the present invention.

Continuous optical waveguide 111 is made primarily of an optical medium with a waveguide refractive index and a fluorescent material 112 distributed therein. Fluorescent material 112 absorbs light at the first wavelength, and re-emits light at a second wavelength. Continuous optical waveguide 111 further comprises a pump optical input 113 which in use is located below the fluid interface 102, and a fluorescent light output 114 which in use is located above the fluid interface 102.

Redirection optics 108 have the function of redirecting the collimated pump beam 104 as it emerges from the lower end 107 of optical conduit 105 so that it is injected into the pump optical input 113 of continuous optical waveguide 111. Further, this redirection must be accomplished such that the collimated pump beam 104 is so oriented within continuous optical waveguide 111 that beam 104 is totally internally reflected by the boundaries of waveguide 111 where those boundaries are in contact with lower fluid 101, and such that beam 104 is refracted out of waveguide 111 where the boundaries of waveguide 111 are in contact with upper fluid 100.

The basic principle of the present invention is that collimated pump beam 104 is retained in the continuous optical waveguide 111 below the fluid interface 102, but escapes from waveguide 111 above the fluid interface 102. Since the fluorescent material 112 contained in waveguide 111 only is only excited to fluorescence in the region where collimated pump beam 104 provides such excitation, the amount of light of the second wavelength which exits the fluorescent light output changes analogously to the position of fluid interface 102.

Figure 1B:
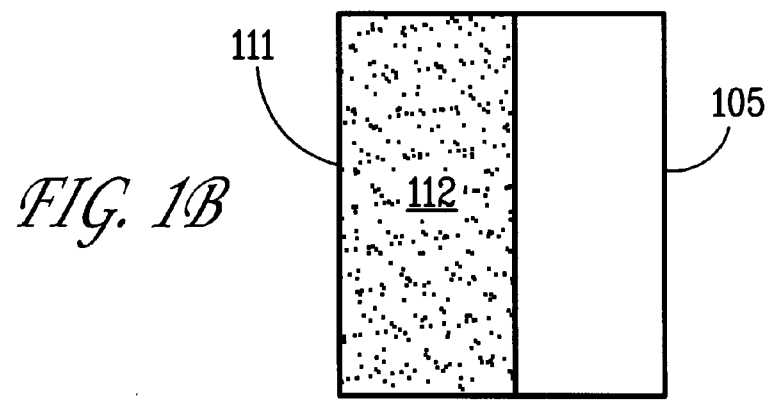
FIG. 1b shows a cross-sectional view of the sensor.

Escape of the collimated pump beam 104 from continuous optical waveguide 111 is illustrated in FIG. 1a, where a first portion 115 of collimated pump beam 104 escapes from continuous optical waveguide 111 into the upper fluid 100, and a second portion 116 of collimated pump beam 104 escapes from optical conduit 105 into the upper fluid 100. Note that in the present implementation, optical conduit 105 and continuous optical waveguide 111 are in optical contact as shown in FIG. 1b, and for convenience are represented in FIG. 1 as having the same refractive index.

In the present implementation, redirection optics 108 is in optical communication with the lower end 107 of optical conduit 105 and with the pump optical input 113 of continuous optical waveguide 111, and are so configured, positioned and oriented as to redirect the collimated pump beam 104 into the pump optical input 113 at a suitable angle and orientation as described above. In the present implementation redirection optics 108 comprise a first reflection surface 109, which serves to so redirect the collimated pump beam 104.

Figure 1C:
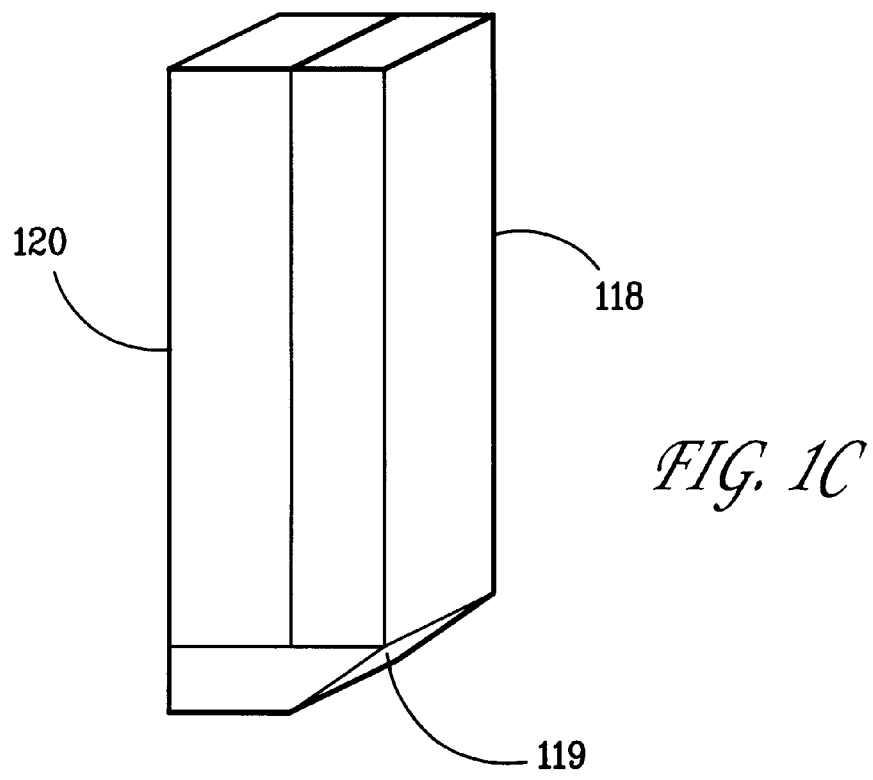
FIG. 1c shows an alternate implementation in which the optical conduit and the redirection optics are integrated into a single component.

Note that it is possible to fabricate a sensor according to the present invention so that redirection optics are an integral part of a modified optical conduit 118, as shown in FIG. 1c. Redirection reflecting surface 119 here performs the role of the redirection optics, sending the collimated pump beam into continuous optical waveguide 120 at the desired angle.

Optics 108 also comprise a fluorescence collection reflecting surface 110, whose purpose is to intercept light of the second wavelength which would otherwise escape through the bottom of optics 108, and reflect said light toward fluorescent light output 114. The effect of fluorescence collection reflecting surface 110 is to increase the amount of light of the second wavelength which is available for collection, thereby making such sensors more sensitive and easier to operate.

A portion of the light of the second wavelength emitted by fluorescent material 112 emerges from the fluorescent light output 114. This light is collected by fluorescence collector 117 for analysis.

As shown in FIG. 3, fluorescence collector 300 can comprise a photodetector 302 in optical communication with fluorescent light output 301 through the medium of fluorescence filter 303 and fiber optic cable 304. Although not required for operation of the present invention, filter 303 allows light of the second wavelength to pass, while light scattered from collimated pump beam 104 is substantially blocked from passing.

The output of photodetector 302 is, in most cases, not immediately useable. It is intended that the electrical output-from photodetector 302 be conveyed to a suitable processor and/or analog gauge 305 so as to provide a viewer or control system with a useful indication of the fluid interface position.

As shown in a preferred implementation in FIG. 3, the optical communication can be provided by fiber optic cable 304, so that all electronic circuitry can be external to the storage tank or other vessel in which the fluid interface position is being measured. Many other configurations for the fluorescence collector will be apparent to one skilled in the art.

Figure 4:
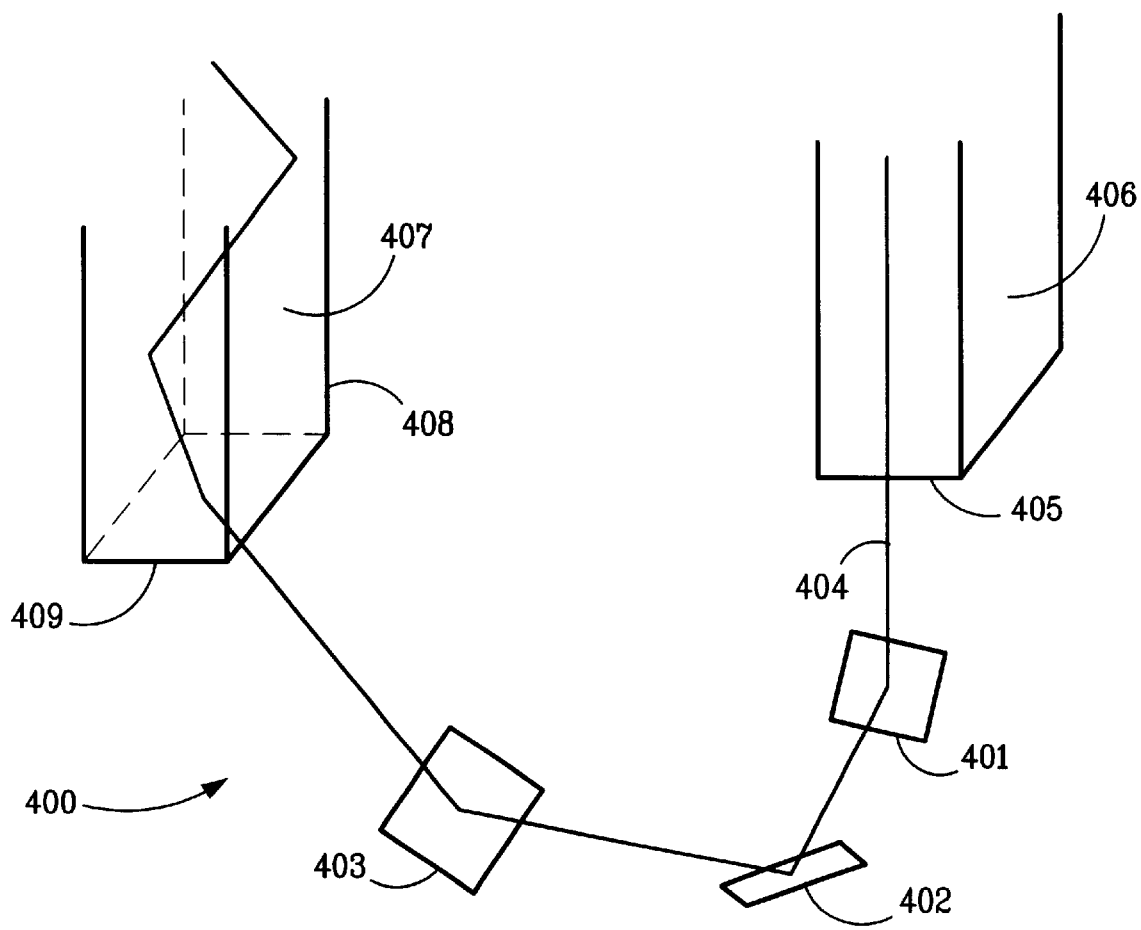
FIG. 4 shows an alternate implementation of the redirection optics for a fluid interface position sensor according to the present invention.

FIG. 4 schematically illustrates a set of redirection optics 400 which comprise a first reflecting surface 401, a second reflecting surface 402, and a third reflecting surface 403. The collimated pump beam 404 is taken as emerging normal to the lower end 405 of the optical conduit 406. Upon so emerging, beam 404 is reflected by first reflecting surface 401 at right angles to an orientation parallel to the surface 407 of the continuous optical waveguide 408. Beam 404 is then reflected by second reflecting surface 402 at right angles to an orientation normal to surface 407. Finally, beam 404 is reflected by third reflecting surface 403 into the pump optical input 409 of the continuous optical waveguide 408 at the desired angle (described above).

As illustrated, waveguide 408 has a rectangular cross-section. The path of beam 404 will, in the implementation here illustrated, define a plane within continuous optical waveguide 408, which is offset from the path of beam 404 in optical conduit 406, a property which can be beneficial, particularly when waveguide 408 and optical conduit 406 are in optical contact along their lengths.

Redirection optics 400, comprising first, second, and third reflecting surfaces 401, 402, and 403, respectively, can be integrated into a single prism of optical medium, whereon some of the reflecting surfaces can have a mirror coating applied thereto. Many other configurations of redirection optics will be apparent to one skilled in the art.

What is claimed is:

1. A fluid interface position sensor comprising:
   a) a continuous optical waveguide, said waveguide having a waveguide refractive index and containing a fluorescent material that absorbs light at a first wavelength and re-emits light at a second wavelength, where said waveguide is immersed in a volume designed to contain a fluid interface between an upper fluid and a lower fluid, the upper fluid having larger refractive index than the lower fluid, where said waveguide further comprises a pump optical input positioned below the fluid interface and a fluorescent light output positioned above the fluid interface;
   b) a collimated pump source generating a collimated pump beam comprising light of the first wavelength;
   c) a fluorescence collector to collect light of the second wavelength, said light collector being in optical communication with said fluorescent light output;
   d) an optical conduit comprising an upper end through which said collimated pump beam is directed so as to emerge through a lower end which is in optical communication with the pump optical input of the continuous optical waveguide; and
   e) redirection optics positioned and oriented to redirect said collimated pump beam into the pump optical input at an angle such that the collimated pump beam is totally internally reflected within the continuous optical waveguide where the waveguide is contacted by the lower fluid and such that the collimated pump beam is refracted out of the waveguide where the waveguide is contacted by the upper fluid;
      wherein the light of the second wavelength is only emitted from the fluorescent material in the region of the waveguide that is contacted by the lower fluid, thereby providing an indication of the position of the fluid interface along the length of the waveguide.

2. The sensor of claim 1, wherein said redirection optics comprise a first reflecting surface.

3. The sensor of claim 2, wherein the first reflecting surface has a mirror coating applied thereto.

4. The sensor of claim 1, wherein said redirection optics comprise multiple reflecting surfaces positioned and oriented so that the collimated pump beam does not propagate within the optical conduit after said collimated pump beam has been redirected into the pump optical input of the continuous optical waveguide.

5. The sensor of claim 4, wherein at least one of the multiple reflecting surfaces has a mirror coating applied thereto.

6. The sensor of claim 1, wherein the cross-sectional shape of the continuous optical waveguide is square or rectangular.

7. The sensor of claim 1, wherein the concentration of the fluorescent material is substantially uniform along the length of the continuous optical waveguide.

8. The sensor of claim 1, wherein the collimated pump source comprises a semiconductor light source emitting the first wavelength.

9. The sensor of claim 1, wherein the collimated pump source comprises a broadband light source in combination with a filter that passes the first wavelength of light, but has substantially zero transmission for the second wavelength of light.

10. The sensor of claim 1, wherein the fluorescence collector comprises an optical detector that is sensitive to the light of the second wavelength.

11. The sensor of claim 10, wherein said optical detector is a photodiode.

12. The sensor of claim 1, wherein the fluorescence collector comprises a filter that passes the second wavelength of light, but has substantially zero transmission for the first wavelength of light.

13. The sensor of claim 1, wherein the redirection optics comprise a fluorescence collection reflecting surface.

14. The sensor of claim 1, wherein the cross-sectional shape of the optical conduit is square or rectangular.

15. The sensor of claim 1, wherein the waveguide refractive index is substantially equal to the conduit refractive index.

16. The sensor of claim 1, wherein the optical conduit and the redirection optics are combined into a single optical component.

17. The sensor of claim 1, wherein the optical conduit, the redirection optics, and the continuous optical waveguide are combined into a single optical component.

* * * * *